Dec. 23, 1969  J. C. THORNTON  3,485,502
CLEANING APPARATUS FOR GRAMOPHONE RECORDS
Filed Aug. 23, 1966

*INVENTOR.*
JAMES COWARD THORNTON

United States Patent Office 3,485,502
Patented Dec. 23, 1969

3,485,502
CLEANING APPARATUS FOR GRAMOPHONE RECORDS
James Coward Thornton, Mountsorrel, England, assignor to J. Goddard & Sons Limited, Leicester, England, a British company
Filed Aug. 23, 1966, Ser. No. 574,452
Int. Cl. G11b 3/58
U.S. Cl. 274—47                              7 Claims

ABSTRACT OF THE DISCLOSURE

A cleaning apparatus for gramophone records wherein a velvet cloth is backed with a foam plastic sheet rolled up in a convolute manner. The composite sheet when rolled up in a convolute manner is received by a tubular plastic container, which is adapted to constitute a former around which the composite sheet can be wrapped for use as a dust remover. Closure means are provided at each end of the container. The closure means at one end being formed by a removable cap, and a pad fitted to the inside of the cap and formed of material such that when rubbed across the velvet material it will remove dust by electrostatic action.

---

This invention is for improvements in or relating to cleaning apparatus for gramophone records, and has for one of its objects to provide a simple, convenient and effective apparatus whereby delicate records may be cleaned of dust and grit without damage to the records.

In accordance with the invention there is provided an assembly of parts comprising a sheet of nylon or similar velvet cloth backed with foam plastic sheet, a tubular container to receive the composite sheet when rolled up, which container is adapted also to constitute a former around which the composite sheet can be wrapped for use as a dust remover, closure means for the tubular container at each end thereof, the closure means at one end being formed by a removable cap, and a pad fitted to the inside of said cap and formed of material such that when rubbed across the nylon velvet material it will remove dust by electrostatic action.

The assembly of parts just referred to constitutes a convenient cleaning assembly, the composite sheet of nylon velvet cloth backed with foam plastic being conveniently of approximately rectangular form and of a size such as to wrap once round the tubular container approximately from end to end thereof. When so wrapped with the nylon velvet material outermost, the container and composite material form a cylindrical cleaning pad by which dust and grit can readily be brushed from a gramophone record as the latter is rotated on a gramophone turntable. The foreign matter removed from the record then becomes lodged in the pile of the nylon velvet cloth and would ordinarily be difficult to remove therefrom. However, the pad aforesaid fitted to the inside of the cap of the container can then be rubbed across the cleaning pad and will remove the dust and grit therefrom by agitation assisted by electrostatic action.

In a convenient construction the nylon velvet sheet employed is one which has been impregnated with an antistatic agent or agents. This provides that when the pad is applied to a gramophone record not only is the foreign matter removed but the surface of the record is lightly treated with a coating protecting it against the generation of static electricity.

The container may be formed of any appropriate transparent or translucent plastic, a suitable material being polyvinyl chloride. The cap which closes one end is made of the same material and is conveniently of a plug type fitted with an external skirt portion spaced outwardly from the plug core and serving to complete a liquid tight seal when the plug is inserted in the container by fitting closely around the rim of the container. The plug portion of the cap may be hollow and have fixed in it a circular or cylindrical pad of the material used for removing dust from the nylon velvet. Such pad projects inwardly from the hollow plug.

The pad fitted to the inside of the cap may be formed of a poly-ether sponge (e.g. poly-urethane sponge) or it may be formed of cellulose sponge. Either of these kinds of material is found, when rubbed across nylon velvet, to generate an electrostatic charge which greatly assists in the removal of dust particles from the pile of the velvet.

The invention is illustrated by way of example in the accompanying drawings in which.

Figure 1:
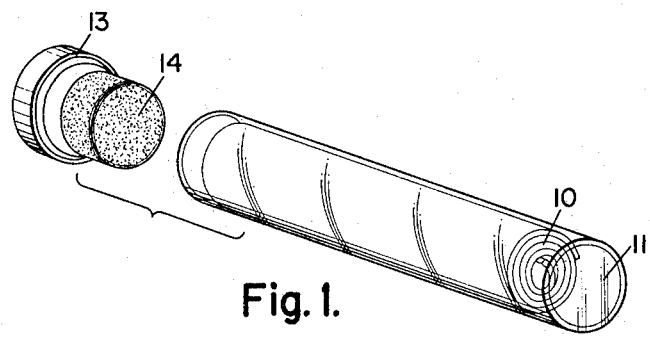
FIGURE 1 is a perspective view of apparatus for cleaning gramophone records according to the invention.
Figure 2:
FIGURE 2 is a section of the sheet of velvet cloth seen in the apparatus of FIGURE 1.
Figure 3:
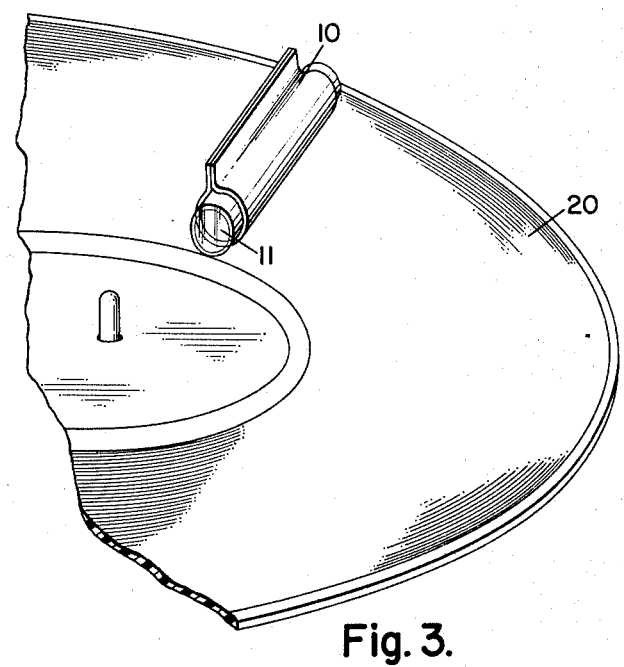
FIGURE 3 is a perspective view of a gramophone record on a turntable being cleaned with apparatus shown in FIGURES 1 and 2, the operator's hand being omitted for the sake of clarity.

As shown in FIGURE 1 the sheet 10 of velvet nylon cloth backed with foam polyurethane sponge (as shown in FIGURE 2) is contained as a roll in a transparent PVC container 11 closed at one end by a sheet of similar PVC and closable at the other by means of a plug 13 having a pad 14 of polyurethane sponge. The dimensions of the sheet 10 are such that when withdrawn from the container 11 it can be wrapped around the container 11 as a former and used for cleaning a gramophone record 20 as shown in FIGURE 3. The apparatus illustrated can be used for all the purposes and in the manner described above.

After the parts have been used for cleaning a record and the pad on the end cap has been wiped across the nylon velvet sheet, the pad can be washed in water to free it from the accumulation of dust and its replacement in the tube in a damp condition, after the composite sheet has been rolled and inserted therein, will assist in maintaining the moisture concentration of the foam backed pile fabric sheet whilst the latter is in the container.

What we claim is:

1. Apparatus for cleaning gramophone records comprising a sheet of velvet cloth backed with foam plastic sheet rolled up in a convolute manner, a tubular container to receive the sheet of velvet cloth backed with foam plastic sheet when rolled up in the convolute manner, which container is adapted also to constitute a former around which the sheet of velvet cloth backed with foam plastic sheet can be wrapped for use as a dust remover, closure means for the tubular container at each end thereof, the closure means at one end being formed by a removable cap, and a pad fitted to the inside of said cap and formed of material such that when rubbed across the velvet cloth, it will remove dust by electrostatic action.

2. Apparatus according to claim 1 in which the velvet is nylon velvet.

3. Apparatus according to claim 1 in which the velvet is impregnated with an antistatic agent.

4. Apparatus according to claim 1 in which the container is of plastic material.

5. Apparatus according to claim 4 in which the container is of polyvinyl chloride.

6. Apparatus according to claim 1 in which the cap is of a plug type fitted with an external skirt spaced outwardly from the plug core and serving to complete a liquid tight seal when the plug is inserted in the container by fitting closely around the rim of the container.

7. Apparatus according to claim 1 in which the pad is of sponge material.

References Cited

UNITED STATES PATENTS 2,652,205   9/1953   Balaban   242—55.5
2,977,127   3/1961   Mertes   274—47

FOREIGN PATENTS 982,599   2/1965   Great Britain.

LEONARD FORMAN, Primary Examiner
R. A. FIELDS, Assistant Examiner

U.S. Cl. X.R.

15—104.93